(12) United States Patent
Inui et al.

(10) Patent No.: US 10,272,367 B2
(45) Date of Patent: Apr. 30, 2019

(54) INFILTRATION INTAKE SYSTEM FOR REVETMENT WALL

(71) Applicant: HITACHI ZOSEN CORPORATION, Osaka-shi, Osaka (JP)

(72) Inventors: Masaki Inui, Osaka (JP); Takayuki Inoue, Osaka (JP)

(73) Assignee: HITACHI ZOSEN CORPORATION, Osaka (JP)

( * ) Notice: Subject to any disclaimer, the term of this patent is extended or adjusted under 35 U.S.C. 154(b) by 0 days.

(21) Appl. No.: 15/557,297

(22) PCT Filed: Nov. 4, 2015

(86) PCT No.: PCT/JP2015/081036
§ 371 (c)(1),
(2) Date: Sep. 11, 2017

(87) PCT Pub. No.: WO2016/143190
PCT Pub. Date: Sep. 15, 2016

(65) Prior Publication Data
US 2018/0056213 A1   Mar. 1, 2018

(30) Foreign Application Priority Data
Mar. 12, 2015  (JP) .................................. 2015-049545

(51) Int. Cl.
*E03B 3/04* (2006.01)
*B01D 24/12* (2006.01)
(Continued)

(52) U.S. Cl.
CPC ............. *B01D 24/12* (2013.01); *B01D 24/02* (2013.01); *B01D 24/4636* (2013.01); *E02B 3/12* (2013.01);
(Continued)

(58) Field of Classification Search
CPC ..... E02B 3/12; E02B 7/00; E02B 7/02; E02B 8/02; E02B 8/023; E02B 8/026;
(Continued)

(56) References Cited

U.S. PATENT DOCUMENTS 344,813 A * 7/1886 Bull .......................... E02B 9/04
  405/127
629,578 A * 7/1899 Maginn ................... E02B 3/023
  210/170.1

(Continued)

FOREIGN PATENT DOCUMENTS

JP   05-285470 A   11/1993
JP   6-10331   *   1/1994

(Continued)

OTHER PUBLICATIONS

Machine translation of JP 6-10331, Jan. 1994.*
International Search Report PCT/JP2015/081036 dated Jan. 15, 2016 with English translation.

*Primary Examiner* — Christopher Upton
(74) *Attorney, Agent, or Firm* — Pillsbury Winthrop Shaw Pittman, LLP

(57) ABSTRACT

This infiltration intake system for a revetment wall includes a structural body, set on an outer wall surface of a revetment wall, including a filter storage portion, a filter stored in the filter storage portion of the structural body, and a water guide portion guiding treated water passing through the filter toward the side of an inner wall surface of the revetment wall.

13 Claims, 4 Drawing Sheets

(51) Int. Cl.
*B01D 24/46* (2006.01)
*E02B 8/02* (2006.01)
*B01D 24/02* (2006.01)
*E02B 3/12* (2006.01)

(52) U.S. Cl.
CPC ............... *E02B 8/026* (2013.01); *E03B 3/04* (2013.01); *B01D 2101/04* (2013.01); *Y02E 10/22* (2013.01)

(58) Field of Classification Search
CPC .. E03B 3/04; E03B 3/36; B01D 24/12; B01D 24/4631; B01D 24/4636
USPC ........ 210/162, 170.09, 170.1, 170.11, 747.5; 405/15, 107, 127, 210
See application file for complete search history.

(56) References Cited

U.S. PATENT DOCUMENTS

| | | | | |
|---|---|---|---|---|
| 802,183 | A * | 10/1905 | Durbrow | A01K 63/04 210/170.09 |
| 975,450 | A * | 11/1910 | Ouimet | A01K 63/04 210/170.09 |
| 3,596,768 | A * | 8/1971 | Whitten, Jr. | 210/170.09 |
| 3,854,291 | A * | 12/1974 | Perkins | E02B 8/023 210/170.1 |
| 4,335,977 | A * | 6/1982 | Ihli | E02B 3/04 405/127 |
| 6,790,345 | B2 * | 9/2004 | Broussard | B01D 24/008 210/162 |
| 2002/0044835 | A1 * | 4/2002 | Esposito | E03B 3/04 405/80 |
| 2009/0230042 | A1 * | 9/2009 | Broussard | C02F 1/001 210/170.09 |
| 2012/0125828 | A1 * | 5/2012 | Watson | E03B 3/04 210/162 |
| 2014/0224746 | A1 | 8/2014 | Niizato et al. | |
| 2018/0050283 | A1 * | 2/2018 | Inui | E03B 3/36 |

FOREIGN PATENT DOCUMENTS

| | | |
|---|---|---|
| JP | 2008-144525 A | 6/2008 |
| JP | 2012-246711 A | 12/2012 |
| JP | 2013-075268 A | 4/2013 |

* cited by examiner

FIRST EMBODIMENT

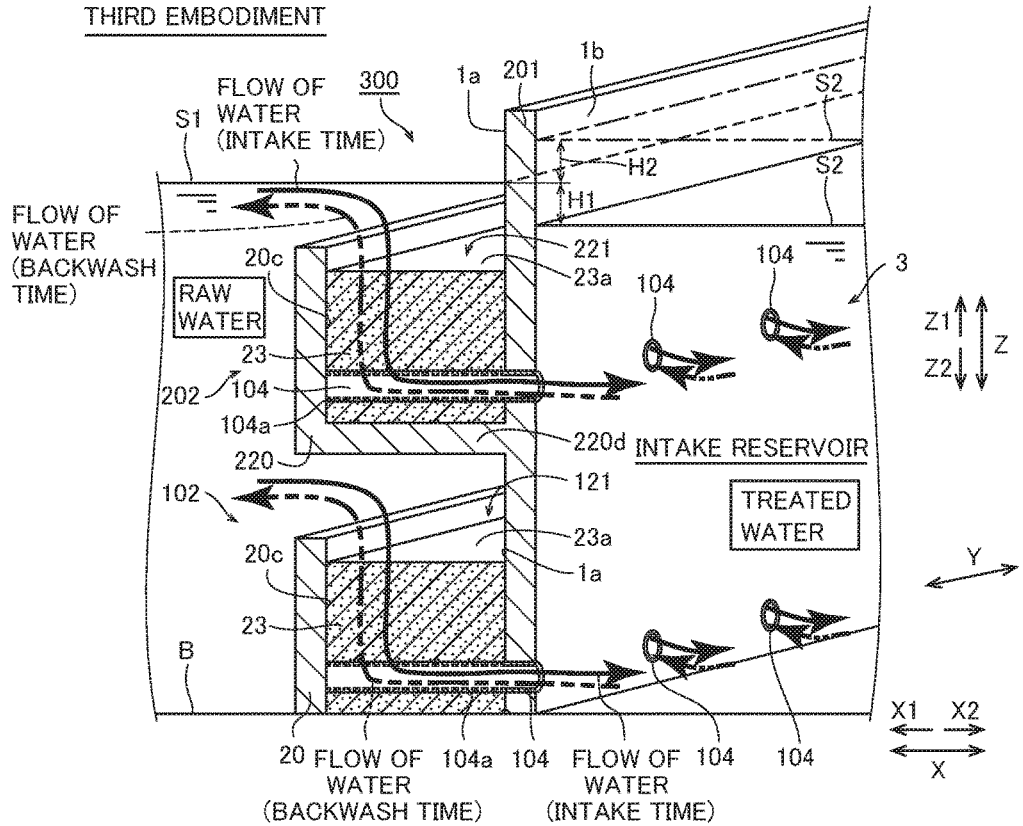
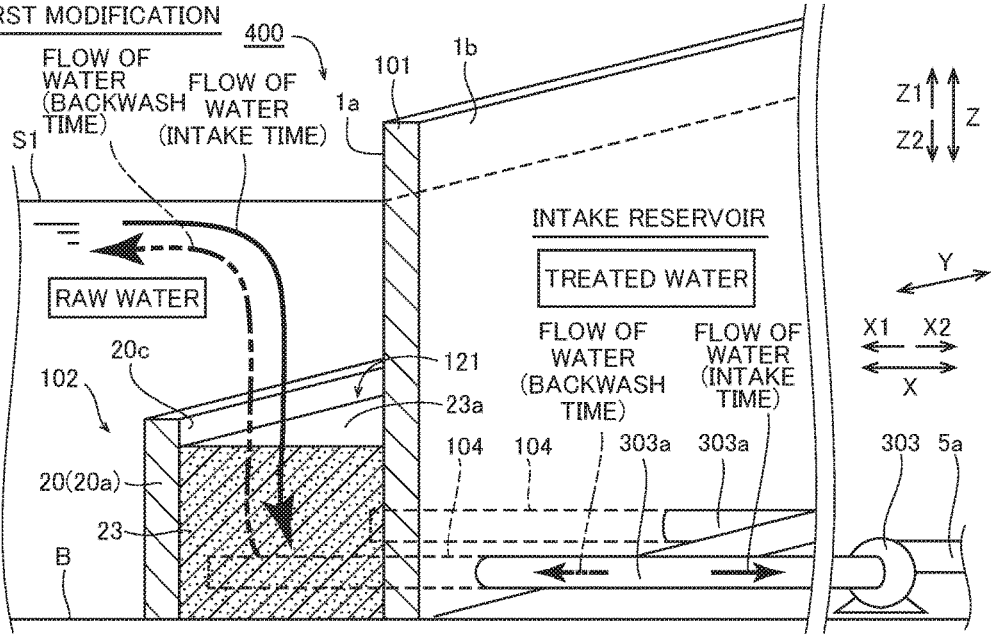

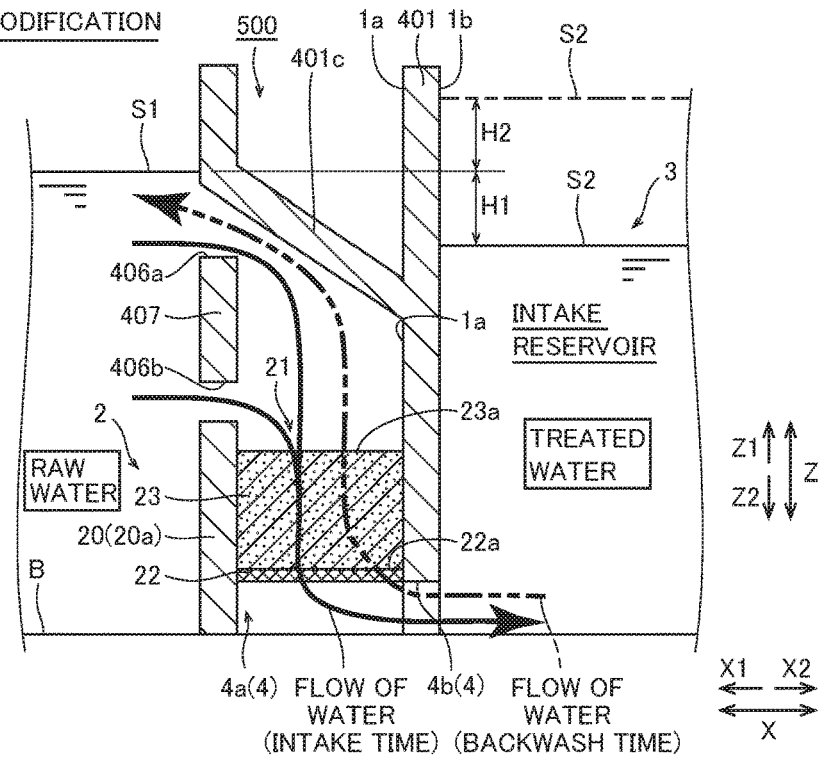
FIG.7 SECOND MODIFICATION
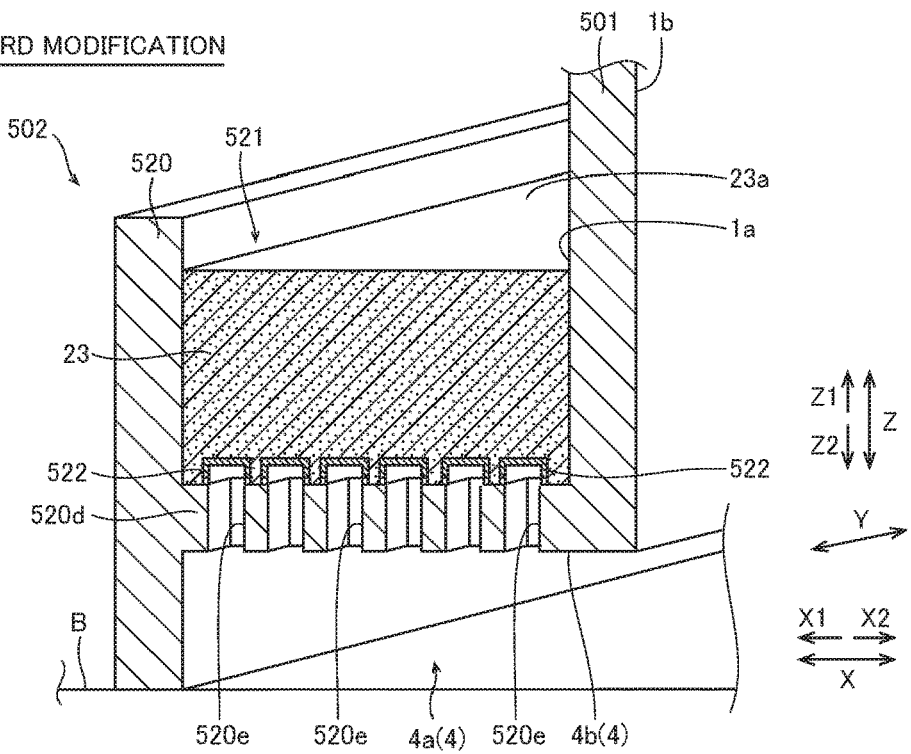
FIG.8 THIRD MODIFICATION

INFILTRATION INTAKE SYSTEM FOR REVETMENT WALL

CROSS-REFERENCE TO RELATED APPLICATIONS

This application is the U.S. National Stage of PCT/JP2015/081036, filed Nov. 4, 2015, which in turn claims priority to Japanese Patent Application No. JP 2015-049545, filed Mar. 12, 2015. The contents of these applications are incorporated herein by reference in their entireties.

TECHNICAL FIELD

The present invention relates to an infiltration intake system for a revetment wall.

BACKGROUND ART

An infiltration intake system for a revetment wall including a filter storage portion is known in general, as disclosed in Japanese Patent Laying-Open No. 2013-75268, for example.

Japanese Patent Laying-Open No. 2013-75268 discloses an infiltration intake unit including a sand filtration layer, a box-type housing, storing the sand filtration layer, set undersea on a seabed surface and an intake pipe for supplying water passing through the sand filtration layer to a seawater desalination plant. The intake pipe of the infiltration intake unit is formed to extend ashore from the undersea housing.

PRIOR ART

Patent Document

Patent Document 1: Japanese Patent Laying-Open No. 2013-75268

SUMMARY OF THE INVENTION

Problems to be Solved by the Invention

In the infiltration intake unit disclosed in Japanese Patent Laying-Open No. 2013-75268, however, the housing is set undersea on the seabed surface, and hence the same must be set on a position separating from the shore side through underwater piping work. Consequently, construction work for providing the infiltration intake unit is conceivably disadvantageously complicated. Further, the length of the intake pipe (a water guide portion) must be increased in order to extend the infiltration pipe ashore from the underwater housing. Consequently, the structure of the intake pipe is also conceivably disadvantageously complicated.

The present invention has been proposed in order to solve the aforementioned problems, and an object of the present invention is to provide an infiltration intake system allowing simplification of construction work for providing the infiltration intake system as well as simplification of the structure of a water guide portion.

Means for Solving the Problems

In order to attain the aforementioned object, an infiltration intake system for a revetment wall according to an aspect of the present invention includes a structural body, set on an outer wall surface of the revetment wall, including a filter storage portion, a filter stored in the filter storage portion of the structural body, and a water guide portion guiding treated water passing through the filter toward the side of an inner wall surface of the revetment wall.

In the infiltration intake system for a revetment wall according to the aspect of the present invention, as hereinabove described, the structural body including the filter storage portion is set on the outer wall surface of the revetment wall. Thus, the structural body can be set on the outer wall surface of the revetment wall when setting the revetment wall, whereby the same can be more easily set as compared with a case of setting the structural body underwater on a water bottom surface separately from the revetment wall. Further, the water guide portion is configured to guide the treated water from the filter stored in the filter storage portion provided on the side of the outer wall surface of the revetment wall toward the side of the inner wall surface thereof, whereby the length of the water guide portion can be sufficiently reduced as compared with the case of setting the structural body underwater on the water bottom surface. Thus, underwater construction work for providing the water guide portion can be simplified or the underwater construction work itself can be curtailed, while the structure of the water guide portion can be simplified. Consequently, the construction work for providing the infiltration intake system can be simplified, and the structure of the water guide portion can also be simplified.

In the infiltration intake system for a revetment wall according to the aforementioned aspect, the filter storage portion of the structural body is preferably so provided as to extend substantially parallelly with a water surface along the outer wall surface of the revetment wall. According to this structure, the filter storage portion can be so easily extended that a region provided therewith can be easily increased in size. Thus, a necessary intake volume can be sufficiently ensured by easily increasing the intake volume of the infiltration intake system for a revetment wall.

In the infiltration intake system for a revetment wall according to the aforementioned aspect, the structural body is preferably so set on the outer wall surface of the revetment wall that the inner wall surface of the structural body and the outer wall surface of the revetment wall constitute an inner wall surface of the filter storage portion. According to this structure, the filter can be stored in the filter storage portion in a state in contact with the outer wall surface of the revetment wall, whereby the treated water passing through the filter can be easily guided toward the side of the inner wall surface of the revetment wall by simply providing the water guide portion to pass through the revetment wall. Further, no rectangular structural body having four sides may be set but the structural body having three sides (the side along the outer wall surface of the revetment wall and the two sides connected with the outer wall surface) may simply be set on the outer wall surface of the revetment wall, whereby the structure of the structural body can be simplified.

The infiltration intake system for a revetment wall according to the aforementioned aspect preferably further includes an intake well, set on the side of the inner wall surface of the revetment wall, having a water level lower than the water level of raw water on the side of the outer wall surface of the revetment wall, and is preferably so configured that the raw water passes through the filter and flows into the intake well through the water guide portion due to the difference between the water level of the raw water in the vicinity of the outer wall surface of the revetment wall and the water level of the intake well. The term "raw water" indicates water not yet filtrated through the filter. According to this structure, the treated water can be guided to the intake well provided on the side of the inner wall surface of the revetment wall through the difference between the water levels of the raw water and the intake well, without employing a power source such as a pump.

In the infiltration intake system for a revetment wall according to the aforementioned aspect, the filter is preferably arranged on a position where a vortex flow is generated on a surface of the filter stored in the filter storage portion when a wave or a flow reaches the outer wall surface of the revetment wall. According to this structure, the surface of the filter can be disturbed (flushed) with the vortex flow generated by the wave or the flow, whereby the filter can be effectively inhibited from clogging with microorganisms, suspended solids, suspended matter and the like adhering thereto.

In the infiltration intake system for a revetment wall according to the aforementioned aspect, the structural body is preferably formed integrally with the revetment wall. According to this structure, the structural body can be more easily set on the revetment wall when setting the revetment wall.

The infiltration intake system for a revetment wall according to the aforementioned aspect preferably further includes a backwash mechanism portion washing the filter by refluxing water from the side of the water guide portion toward the side of the filter. According to this structure, microorganisms, suspended solids, suspended matter and the like adhering to the filter can be discharged from the filter toward the raw water side with the refluxed water, whereby the filter can be effectively inhibited from clogging.

In the infiltration intake system for a revetment wall according to the aforementioned aspect, a plurality of the structural bodies are preferably set on the outer wall surface of the revetment wall at prescribed intervals in the vertical direction. According to this structure, the plurality of structural bodies are so set in the vertical direction that a necessary intake volume can be reliably ensured also when the length of the revetment wall on which the structural bodies are settable is small.

Effect of the Invention

According to the present invention, as hereinabove described, the infiltration intake system allowing simplification of the construction work for providing the infiltration intake system as well as simplification of the structure of the water guide portion can be provided.

BRIEF DESCRIPTION OF THE DRAWINGS

FIG. 5 A fragmented perspective view showing an infiltration intake system according to a third embodiment of the present invention.

FIG. 6 A fragmented perspective view showing an infiltration intake system for a revetment wall according to a first modification of the present invention.

FIG. 7 A sectional view showing an infiltration intake system for a revetment wall according to a second modification of the present invention.

FIG. 8 A fragmented perspective view showing a filter storage portion according to a third modification of the present invention in an enlarged manner.

MODES FOR CARRYING OUT THE INVENTION

Figure 1:
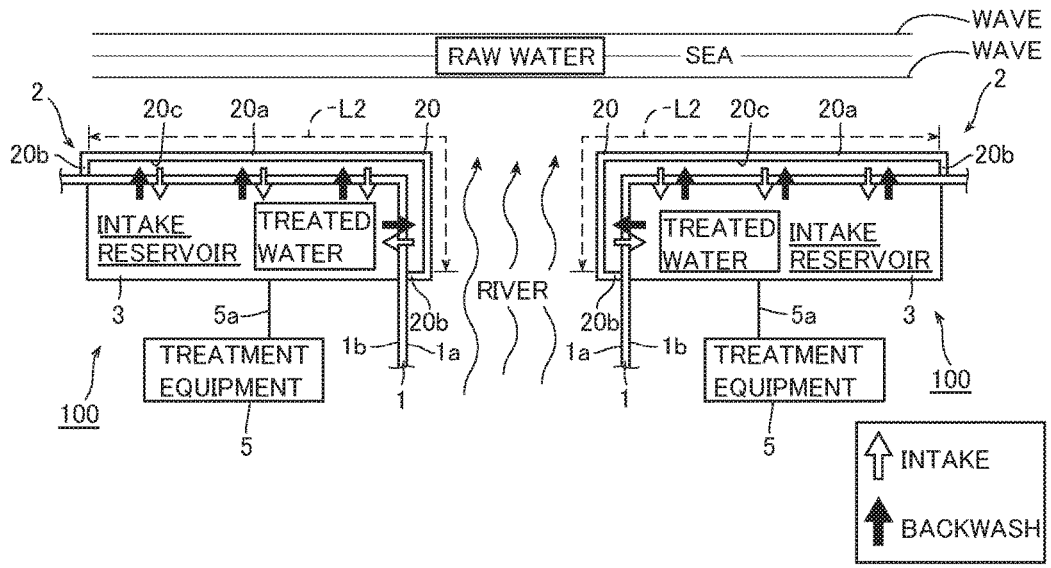
FIG. 1 A schematic diagram showing an example of a position where a structural body of an infiltration intake system according to a first embodiment of the present invention is set.

Embodiments of the present invention are now described with reference to the drawings.

First Embodiment

The overall structure of an infiltration intake system 100 according to a first embodiment of the present invention is described with reference to FIGS. 1 to 3. The infiltration intake system 100 is an example of the "infiltration intake system for a revetment wall" in the present invention.

(Structure of Infiltration Intake System)

The infiltration intake system 100 according to the first embodiment of the present invention is employed for obtaining clean and clear water (treated water) by removing foreign matter constituted of suspended solids such as driftwood, refuse, marine organisms, fluvial organisms, microorganisms such as planktons, suspended matter (insoluble matter having a particle diameter not more than a prescribed level) and the like from water (raw water) such as seawater or brackish water without performing injection of chemicals or the like. This infiltration intake system 100 is provided on an estuary and a revetment wall 1 provided around the same, and configured to intake water (raw water) from the seashore, the coast and the river.

According to the first embodiment, the infiltration intake system 100 includes an infiltration intake structural body 2 set on an outer wall surface 1a (on a raw water side) of the revetment wall 1, an intake reservoir 3 set on the side of an inner wall surface 1b (a treated water side) of the revetment wall 1, and a water guide portion 4 (see FIG. 2) connecting the infiltration intake structural body 2 and the intake reservoir 3 with each other. The infiltration intake structural body 2 storing a filter 23 has a function of filtrating raw water and turning the same into treated water. The infiltration reservoir 3 has a function of reserving the treated water received from the infiltration intake structural body 2. The infiltration intake structural body 2 and the intake reservoir 3 are examples of the "structural body" and the "intake well" in the present invention respectively.

The treated water reserved in the intake reservoir 3 is pumped up with a pump (not shown) or the like provided on a treatment equipment 5 through an intake pipe 5a and treated into desired water. When the treatment equipment 5 is a desalination plant, for example, clean and clear water (treated water) is further treated into domestic water such as drinking water by a reverse osmosis membrane method or an evaporation method. Examples of the treatment equipment 5 are a plant employing the treated water as cooling water, an aquarium employing the treated water for water tanks, a seawater pool and a speedboat racecourse employing the treated water as pool water, an aquaculture farm employing the treated water for aquaculture ponds and the like.

The revetment wall 1 is formed to be along the riverbank and the seashore. Further, the revetment wall 1 is formed to extend in the vertical direction (a direction Z) from a water bottom surface B to a vertical position upward (along arrow Z1) beyond a surface S1 of the raw water, as shown in FIG. 2. Thus, the revetment wall 1 is formed to partition the raw water on the side of the outer wall surface 1a (a side X1) and the treated water on the side of the inner wall surface 1b (a side X2) from each other. The vertical length L1 (see FIG. 3) of the revetment wall 1 is preferably at least about 10 m and not more than about 20 m.

<Structure of Infiltration Intake Structural Body>

The infiltration intake structural body 2 includes a wall portion 20 having a first wall portion 20a formed to extend along the extensional direction (a direction Y) of the revetment wall 1 and a pair of second wall portions 20b (see FIG. 1) extending toward the revetment wall 1 from both end portions of the first wall portion 20b to be connected (bonded) to the revetment wall 1. The pair of second wall portions 20b are so bonded to the outer wall surface 1a of the revetment wall 1 that the wall portion 20 is formed integrally with the revetment wall 1. The wall portion 20 is formed to extend in the vertical direction from the water bottom surface B up to a vertical position downward (along arrow Z2) beyond the surface S1 of the raw water.

The infiltration intake structural body 2 is provided with a filter storage portion 21. The filter storage portion 21 is provided as a space demarcated by three inner wall surfaces 20c of the wall portion 20, the outer wall surface 1a of the revetment wall 1 and an upper surface 22a of a screen portion 22. The three inner wall surfaces 20c of the first wall portion 20a and the pair of second wall portions 20b (see FIG. 1) and the outer wall surface 1a on one side of the revetment wall 1 constitute four inner wall surfaces (inner side surfaces) of the filter storage portion 21, while the upper surface 22a of the screen portion 22 constitutes the bottom surface of the filter storage portion 21.

The filter storage portion 21 is formed to extend along the extensional direction Y of the outer wall surface 1a of the revetment wall 1 with a length L2 (shown by broken lines in FIG. 1) similarly to the wall portion 20, as shown in FIG. 1. The length L2 is preferably at least about 10 m and not more than about 10000 m. Further, the filter storage portion 21 is formed to extend substantially parallelly with the water surface S1, as shown in FIG. 2. The distance (between the inner wall surface 20c of the first wall portion 20a and the outer wall surface 1a of the revetment wall 1) D1 (see FIG. 3) of the filter storage portion 21 in the depth direction is at least about 0.5 m and not more than about 2 m.

In the filter storage portion 21, the length L2 and the distance D1 are set on the basis of a desired intake volume in the infiltration intake system 100. When the infiltration intake system 100 requires an intake volume of about 5000 m$^3$/day and an average intake speed in the infiltration intake system 100 is about 10 m/day, for example, the area of the filter storage portion 21 in a horizontal plane is set to about 500 m$^2$ (=5000 m$^3$/10 m). Thus, the length L2 is set to about 500 m ((=500 m$^2$/1 m) when the distance D1 is about 1 m.

Figure 2:
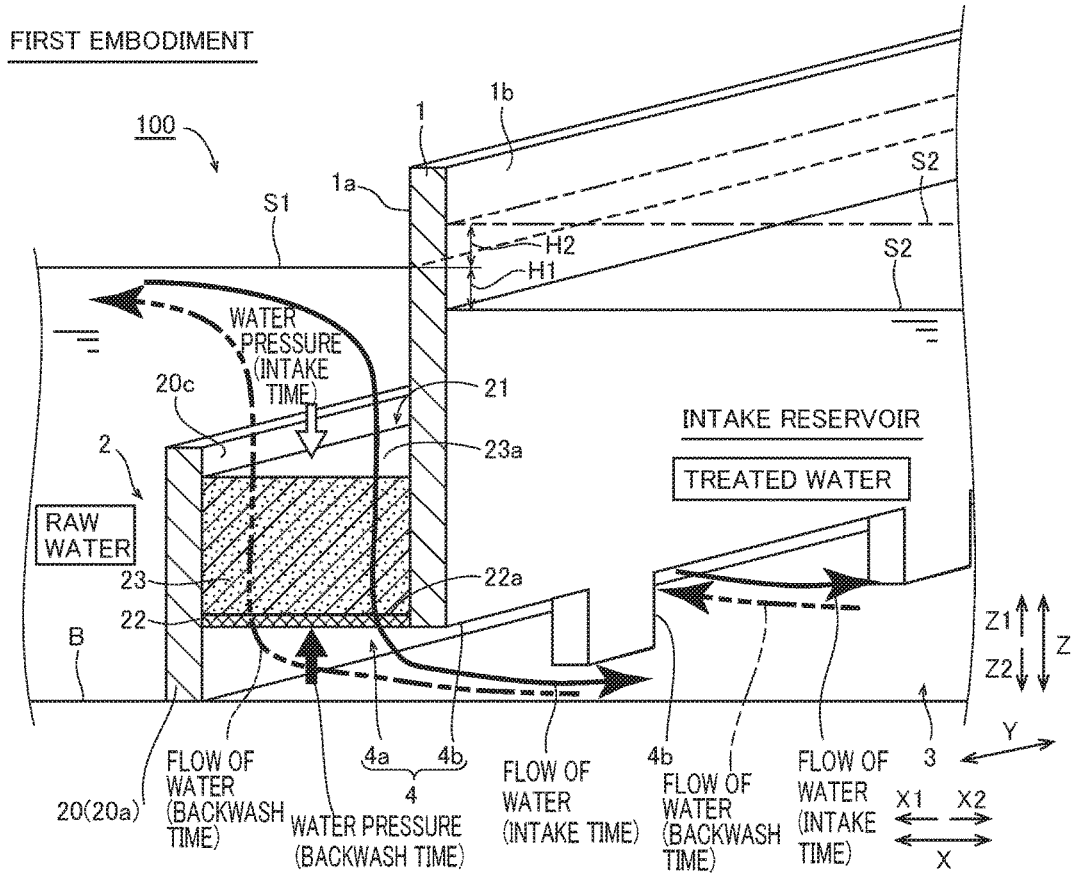
FIG. 2 A fragmented perspective view showing the infiltration intake system according to the first embodiment of the present invention.
Figure 3:
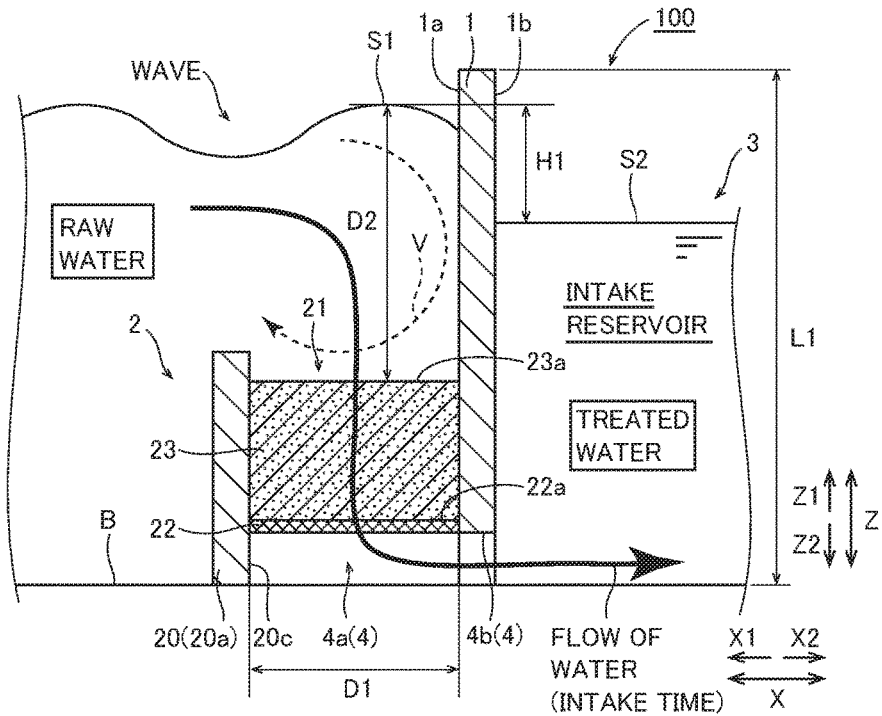
FIG. 3 A sectional view showing the infiltration intake system according to the first embodiment of the present invention.

According to the first embodiment, the infiltration intake system 100 further includes a filter 23 stored in the filter storage portion 21, as shown in FIG. 2. The filter 23 is so stored in the filter storage portion 21 as to filtrate the raw water in the vertical direction downward (toward the side Z2) from above (from the side Z1). For example, sand or gravel is so arranged that the particle diameter thereof is gradually increased downward from above, thereby forming the filter 23. One or more types of sand, gravel, spheres made of resin or ceramic, porous bodies made of resin or ceramic, substances formed by bundling nonwoven fabric or fiber and working the same into spheres or pellets and the like can be used as the filter 23.

When the water intake speed is at least about 5 m/day or the filter storage portion 21 continuously stores the filter 23 over a long period, foreign matter resulting from microorganisms, suspended solids, suspended matter and the like accumulates on a surface 23a of the filter 23, to easily block the filter 23. According to the first embodiment, therefore, the filter 23 is arranged on a depth position where a vortex flow V is generated on the surface 23a of the filter 23 stored in the filter storage portion 21 when a wave or a flow (a flow of the raw water) reaches the outer wall surface 1a of the revetment wall 1, as shown in FIG. 3. The distance (a depth D2) between the water surface S1 and the surface 23a of the filter 23 in the vertical direction is at least about 2 m and not more than about 10 m.

When the wave or the flow reaches the outer wall surface 1a of the revetment wall 1, the vortex flow V directed toward the side of the revetment wall 1 on the water surface S1 and directed toward the side separating from the revetment wall 1 in the water is generated in the vicinity of the outer wall surface 1a. At this time, the flow of the vortex flow V toward the side separating from the revetment wall 1 disturbs (flushes) the surface 23a of the filter 23 arranged on the position where the vortex flow V is generated. Thus, foreign matter adhering to the vicinity of the surface 23a of the filter 23 is raised up, and the filter 23 is inhibited from clogging (blocking).

The filter 23 is preferably made of a material sufficiently disturbed by the vortex flow V with a weight hardly raised up, to be inhibited from flowing out of the filter storage portion 21. Further, the filter 23 can be effectively inhibited from flowing out of the filter storage portion 21 when the same is stored in a bag of a prescribed size having a mesh not passing the filter 23 therethrough while passing water.

The screen portion 22 is fixed to the three inner wall surfaces 20c of the wall portion 20 and the single outer wall surface 1a of the revetment wall 1 to constitute the bottom portion of the filter storage portion 21, as shown in FIG. 2. Further, the screen portion 22 is provided in the form of a mesh smaller than the particle diameter of the filter 23 arranged immediately thereon, not to pass the filter 23 therethrough. The screen portion 22 may alternatively be provided in the form of slits smaller than the particle diameter of the filter 23.

<Structure of Water Guide Portion>

The water guide portion 4 includes an outer wall surface-side water guide portion 4a formed under the filter storage portion 21 and a plurality of water guide ports 4b formed on the revetment wall 1 to pass therethrough. The outer wall surface-side water guide portion 4a is constituted of a space formed by the water bottom surface B and the inner wall surfaces 20c (see FIG. 1) of the first wall portion 20a and the pair of second wall portions 20b positioned under the filter storage portion 21 on the side of the outer wall surface 1a. The water guide ports 4b are so provided as to connect the outer wall surface-side water guide portion 4a and the intake reservoir 3 with each other by passing through the revetment wall 1 on the lower end thereof. The plurality of water guide ports 4b are provided at prescribed intervals in the direction Y along the revetment wall 1.

The water guide portion 4 is so formed by parts of the revetment wall 1 and the infiltration intake structural body 2 that underwater construction work for providing the water guide portion 4 itself can be curtailed.

<Structure of Intake Reservoir>

The intake reservoir 3 is formed on the side of the inner wall surface 1b of the revetment wall 1, to correspond to the infiltration intake structural body 2 (the wall portion 20). A water level difference (H1 or H2) between the water surfaces S1 and S2 of the raw water and the intake reservoir 3 can be caused by adjusting the quantity of pumping (the intake volume) of the treated water reserved in the intake reservoir 3.

<As to Intake>

At an intake time, the water level of the intake reservoir 3 from the water bottom surface B up to the water surface S2 (shown by a solid line in FIG. 2) thereof is rendered lower than that of the raw water in the vicinity of the outer wall surface 1a of the revetment wall 1 from the wall bottom surface B up to the water surface S1 of the raw water by the water level difference H1 in the infiltration intake system 100. Thus, water pressure from the side of the filter 23 (the upper side) toward the side of the water guide portion 4 (the lower side) results from the water level difference H1. The raw water passes through the filter 23 downward from above due to this water pressure. Then, the raw water flows into the intake reservoir 3 as the treated water through the screen portion 22 and the water guide portion 4.

<As to Backwash>

The infiltration intake system 100 is configured to wash (backwash) the filter 23 by refluxing water through the filter 23 from the side of the water guide portion 4 toward the side of the filter 23, in addition to the washing of the filter 23 with the vortex flow V. More specifically, the water level of the intake reservoir 3 from the water bottom surface B up to the water surface S2 (shown by a two-dot chain line in FIG. 2) thereof is rendered higher than that of the raw water by the water level difference H2 at a backwash time in the infiltration intake system 100. Thus, water pressure from the side of the water guide portion 4 toward the filter 23 results from the water level difference H2 in the filter 23. The raw water passes (flows backward) through the filter 23 upward from below due to this water pressure. The treated water passing through the filter 23 is raised up from the surface 23a of the filter 23 as wastewater along with the foreign matter present in the filter 23. Thus, the filter 23 is washed. Consequently, no periodic washing by a diver or the like is required in order to remove foreign matter accumulating in the filter 23. The intake reservoir 3 is an example of the "backwash mechanism portion" in the present invention.

The speed (the intake speed or the backwash speed) of the water passing through the filter 23 can be adjusted by adjusting the magnitudes of the water level differences H1 and H2 thereby adjusting the magnitude of the water pressure. The intake speed is preferably at least about 5 m/day. In the infiltration intake system 100 according to the first embodiment, sufficiently clean and clear treated water can be intaken at an intake speed of about 50 m/day.

Effects of First Embodiment

According to the first embodiment, the following effects can be attained:

According to the first embodiment, as hereinabove described, the infiltration intake structural body 2 including the filter storage portion 21 is set on the outer wall surface 1a of the revetment wall 1. Thus, the infiltration intake structural body 2 can be set on the outer wall surface 1a of the revetment wall 1 when setting the revetment wall 1, whereby the same can be more easily set as compared with a case of setting an infiltration intake structural body underwater (in the raw water) on the water bottom surface B independently of the revetment wall 1. Further, the water guide portion 4 is configured to guide the treated water from the filter 23 stored in the filter storage portion 21 provided on the side of the outer wall surface 1a of the revetment wall 1 toward the side of the inner wall surface 1b thereof, whereby the length of the water guide portion 4 can be sufficiently reduced as compared with the case of setting an infiltration intake structural body underwater on the water bottom surface B. Thus, underwater construction work for providing the water guide portion 4 can be simplified or the underwater construction work itself can be curtailed, and the structure of the water guide portion 4 can be simplified. Consequently, construction work for providing the infiltration intake system 100 can be simplified, and the structure of the water guide portion 4 can also be simplified.

According to the first embodiment, the filter storage portion 21 of the infiltration intake structural body 2 is so provided as to extend along the outer wall surface 1a of the revetment wall 1 substantially parallelly with the water surface S1. Thus, the filter storage portion 21 can be so easily extended that the region provided therewith can be easily increased in size. Consequently, a necessary intake volume can be sufficiently ensured by easily increasing the intake volume of the infiltration intake system 100.

According to the first embodiment, the wall portion 20 of the infiltration intake structural body 2 is so set on the outer wall surface 1a of the revetment wall 1 that the inner wall surfaces 20c of the infiltration intake structural body 2 and the outer wall surface 1a of the revetment wall 1 constitute the inner wall surfaces of the filter storage portion 21. Thus, the filter 23 can be stored in the filter storage portion 21 in the state in contact with the outer wall surface 1a of the revetment wall 1, whereby the treated water passing through the filter 23 can be easily guided toward the side of inner wall surface 1b of the revetment wall 1 by simply providing the water guide ports 4b of the water guide portion 4 to pass through the revetment wall 1. Further, no rectangular infiltration intake structural body having four sides may be provided but the wall portion 20 of the infiltration intake structural body 2 having three sides (the side (the first wall portion 20a) along the outer wall surface 1a of the revetment wall 1 and the two sides (the pair of second wall portions 20b) connected with the outer wall surface 1a) may simply be set on the outer wall surface 1a of the revetment wall 1, whereby the structure of the infiltration intake structural body 2 can be simplified.

According to the first embodiment, the infiltration intake system 100 is so configured that the raw water passes through the filter 23 and flows into the intake reservoir 3 through the water guide portion 4 due to the difference H1 between the water level of the raw water in the vicinity of the outer wall surface 1a of the revetment wall 1 and that of the intake reservoir 3. Thus, the treated water can be guided to the intake reservoir 3 on the side of the inner wall surface 1b of the revetment wall 1 due to the difference H1 between the water levels of the raw water and the intake reservoir 3, without employing a power source such as a pump.

According to the first embodiment, the filter 23 is arranged on the position where the vortex flow V is generated on the surface 23a of the filter 23 stored in the filter storage portion 21 when a wave or a flow reaches the outer wall surface 1a of the revetment wall 1. Thus, the vortex flow V generated by the wave or the flow can disturb (flush) the surface 23a of the filter 23, whereby the filter 23 can be effectively inhibited from clogging with microorganisms, suspended solids, suspended matter and the like adhering thereto.

According to the first embodiment, the wall portion 20 of the infiltration intake structural body 2 is so formed integrally with the revetment wall 1 that the same can be more easily set on the revetment wall 1 when setting the revetment wall 1.

According to the first embodiment, the water level of the intake reservoir 3 from the water bottom surface B up to the water surface 2 thereof is rendered higher than that of the raw water by the water level difference H2, thereby configuring the intake reservoir 3 to wash the filter 23 by refluxing water from the side of the water guide portion 4 toward the side of the filter 23. Thus, microorganisms, suspended solids, suspended matter and the like adhering to the filter 23 can be discharged therefrom toward the raw water side with the refluxed water, whereby the filter 23 can be effectively inhibited from clogging.

According to the first embodiment, the infiltration intake system 100 is configured to adjust the speed (the intake speed) of the water passing through the filter 23 by adjusting the magnitude of the water level difference H1 thereby adjusting the magnitude of the water pressure. Thus, the intake volume can be easily adjusted by adjusting the intake speed also in a case of setting the infiltration intake structural body 2 with a prescribed size.

According to the first embodiment, the filter storage portion 21 so stores the filter 23 as to filtrate the raw water in the vertical direction downward from above. Thus, the filter 23 can be easily stored in the filter storage portion 21 by its own weight without employing a net or the like for fixing and storing the filter 23 to and in the filter storage portion 21, as compared with a case where a filter storage portion so horizontally stores a filter as to filtrate raw water in the horizontal direction.

Second Embodiment

An infiltration intake system 200 according to a second embodiment of the present invention is now described with reference to FIG. 4. In the infiltration intake system 200 according to the second embodiment of the present invention, a plurality of screen pipes 104 are set in place of the water guide portion 4 in the aforementioned first embodiment. Structures similar to those in the aforementioned first embodiment are denoted by the same reference signs as those in the first embodiment, and redundant description is not repeated. The infiltration intake system 200 is an example of the "infiltration intake system for a revetment wall" in the present invention, and the screen pipes 104 are examples of the "water guide portion" in the present invention.

(Structure of Infiltration Intake System)

Figure 4:
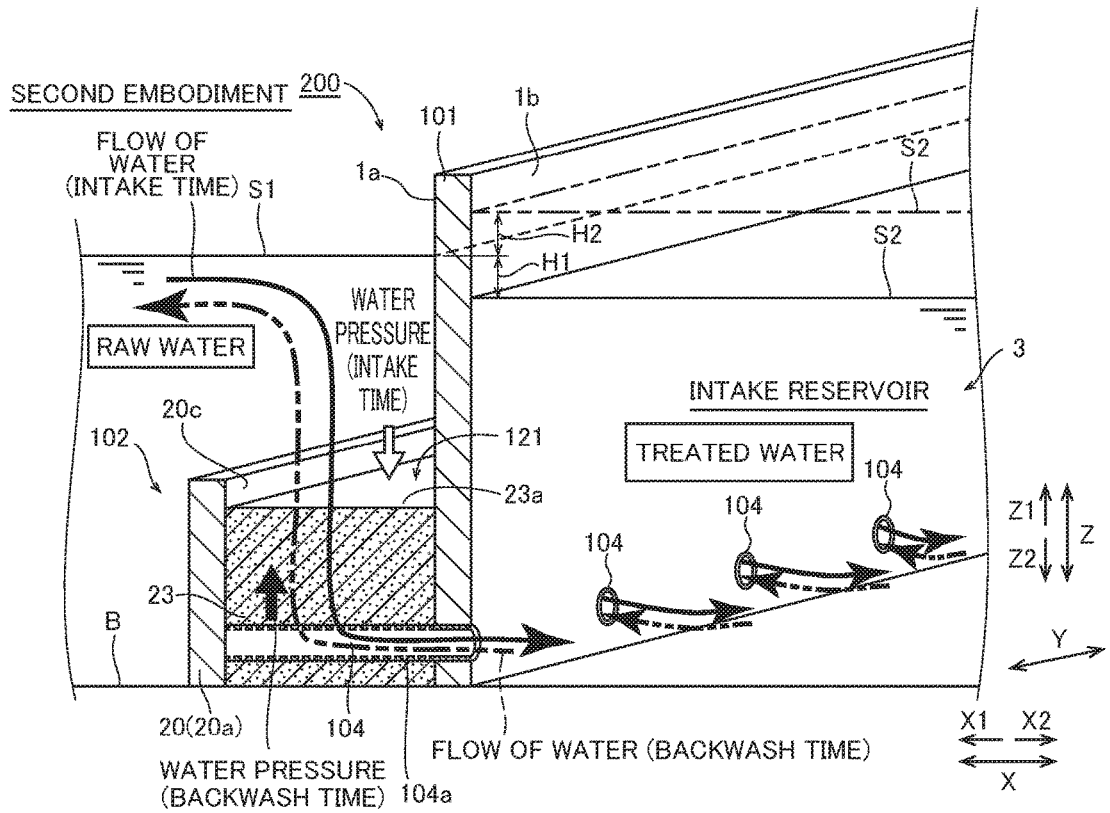
FIG. 4 A fragmented perspective view showing an infiltration intake system according to a second embodiment of the present invention.

The infiltration intake system 200 according to the second embodiment of the present invention includes an infiltration intake structural body 102 set on an outer wall surface 1a (on a raw water side) of a revetment wall 101, an intake reservoir 3 and the plurality of screen pipes 104 connecting the infiltration intake structural body 102 and the intake reservoir 3 with each other, as shown in FIG. 4.

<Structure of Infiltration Intake Structural Body>

The infiltration intake structural body 102 has a wall portion 20 similar to that of the infiltration intake structural body 1 according to the first embodiment. The infiltration intake structural body 102 is provided with a filter storage portion 121 storing a filter 23. The filter storage portion 121 is provided as a space demarcated by inner wall surfaces 20c of a first wall portion 20a and a pair of second wall portions 20b of the wall portion 20 similar to those of the first embodiment shown in FIG. 1, the outer wall surface 1a (see FIG. 4) of the revetment wall 101 and a water bottom surface B.

<Structure of Screen Pipe>

The plurality of screen pipes 104 are arranged at prescribed intervals in a direction Y along the revetment wall 101 on a lower portion of the filter storage portion 121 (the filter 23). Further, the screen pipes 104 extend in a direction X orthogonal to the revetment wall 101, to pass therethrough. Thus, end portions of the screen pipes 104 on the side of the intake reservoir 3 (along arrow X2) are exposed toward the side of an inner wall surface 1b of the revetment wall 101.

Each screen pipe 104 has a large number of slits 104a. Thus, water passing through the filter 23 downward from above at an intake time flows into the screen pipe 104 through the slits 104a, so that the intake reservoir 3 intakes treated water. On the other hand, water flowing backward through each screen pipe 104 at a backwash time passes through the filter 23 upward from below through the slits 104a, to be raised up from a surface 23a of the filter 23 as wastewater along with foreign matter present in the filter 23.

The plurality of screen pipes 104 are arranged by being inserted into hole portions so provided as to pass through the revetment wall 101. Consequently, underwater construction work for arranging the screen pipes 104 itself can be curtailed. The remaining structures of the second embodiment are similar to those of the aforementioned first embodiment.

Effects of Second Embodiment

According to the second embodiment, the following effects can be attained:

According to the second embodiment, as hereinabove described, the infiltration intake structural body 102 including the filter storage portion 121 is set on the outer wall surface 1a of the revetment wall 101. Thus, construction work for providing the infiltration intake system 200 can be simplified similarly to the aforementioned first embodiment, and the structures of the screen pipes 104 can be simplified.

According to the second embodiment, further, no space may be ensured under the filter storage portion 121 due to the employment of the plurality of screen pipes 104 dissimilarly to the outer wall surface-side water guide portion 4a according to the aforementioned first embodiment, whereby the infiltration intake structural body 102 can be downsized in the vertical direction. The remaining effects of the second embodiment are similar to those of the aforementioned first embodiment.

Third Embodiment

An infiltration intake system 300 according to a third embodiment of the present invention is described with reference to FIG. 5. In the infiltration intake system 300 according to the third embodiment of the present invention, two infiltration intake structural bodies 102 and 202 are provided in the vertical direction on a system similar to the infiltration intake system 200 according to the aforementioned second embodiment, to implement a two-stage structure. Structures similar to those of the aforementioned first and second embodiments are denoted by the same reference signs as those in the first and second embodiments, and redundant description is not repeated. The infiltration intake system 300 is an example of the "infiltration intake system for a revetment wall" in the present invention, and the infiltration intake structural body 202 is an example of the "structural body" in the present invention.

(Structure of Infiltration Intake System)

The infiltration intake system 300 according to the third embodiment of the present invention includes the two infiltration intake structural bodies 102 and 202, storing filters 23, set on an outer wall surface 1*a* (on a raw water side) of a revetment wall 201, an intake reservoir 3 and a plurality of screen pipes 104 connecting the infiltration intake structural body 102 or 202 and the intake reservoir 3 with each other, as shown in FIG. 5.

<Structure of Infiltration Intake Structural Body>

The infiltration intake structural bodies 102 and 202 are formed at a prescribed interval in the vertical direction (a direction Z), to implement the two-stage structure. The infiltration intake structural body 102 provided on the lower side (along arrow Z2) is similar in structure to the infiltration intake structural body 102 according to the second embodiment. On the other hand, a wall portion 220 of the infiltration intake structural body 202 provided on the upper side (along arrow Z1) includes a bottom portion 220*d* extending in a horizontal plane, in addition to a structure similar to that of the wall portion 20 of the infiltration intake structural body 102 according to the second embodiment. The wall portion 220 is formed integrally with the revetment wall 201. Further, the wall portion 220 of the upper infiltration intake structural body 202 is formed up to a vertical position downward beyond a water surface S1 of raw water.

The infiltration intake structural body 202 is provided with a filter storage portion 221 storing the corresponding filter 23. The filter storage portion 221 is provided as a space demarcated by inner wall surfaces 20*c* of the wall portion 220 including the bottom portion 220*d* and the outer wall surface 1*a* of the revetment wall 201. The plurality of screen pipes 104 are arranged on a lower portion of the filter storage portion 221 (the filter 23) of the infiltration intake structural body 202.

According to the third embodiment, the filters 23 of the infiltration intake structural bodies 102 and 202 (a filter storage portion 121 and the filter storage portion 221) are configured to be substantially simultaneously backwashed. Thus, the lower infiltration intake structural body 102 (the filter storage portion 121) can be inhibited from intaking wastewater discharged from the upper infiltration intake structural body 202 (the filter storage portion 221). The remaining structures of the third embodiment are similar to those of the aforementioned first and second embodiments.

Effects of Third Embodiment

According to the third embodiment, the following effects can be attained:

According to the third embodiment, as hereinabove described, the infiltration intake structural bodies 102 and 202 including the filter storage portions 121 and 221 respectively are set on the outer wall surface 1*a* of the revetment wall 201. Thus, construction work for providing the infiltration intake system 300 can be simplified similarly to the aforementioned first embodiment, and the structures of the screen pipes 104 can also be simplified.

According to the third embodiment, the infiltration intake structural bodies 102 and 202 are provided on the outer wall surface 1*a* of the revetment wall 201 at a prescribed interval in the vertical direction, whereby a necessary intake volume can be reliably ensured also when the length of the revetment wall 201 on which the infiltration intake structural bodies 102 and 202 are settable is small. The remaining effects of the third embodiment are similar to those of the aforementioned first and second embodiments.

Modifications

The embodiments disclosed this time must be considered as illustrative in all points and not restrictive. The range of the present invention is shown not by the above description of the embodiments but by the scope of claims for patent, and all changes (modifications) within the meaning and range equivalent to the scope of claims for patent are further included.

For example, while the infiltration intake system for a revetment wall according to the present invention is employed as a system for obtaining clean and clear water (treated water) from water (raw water) such as seawater or brackish water in each of the aforementioned first to third embodiments, the present invention is not restricted to this. The infiltration intake system for a revetment wall according to the present invention is applicable to any equipment requiring treated water obtained by removing foreign matter from raw water, regardless of the type of the raw water or positions for intaking the raw water. For example, the infiltration intake system for a revetment wall according to the present invention may be employed as a system for obtaining clean and clear water (treated water) from lake water (raw water) or the like by setting a structural body including a filter storage portion on an outer side surface of a revetment wall set on a lakeside or the like and providing a water guide portion guiding treated water passing through a filter toward the side of an inner wall surface of the revetment wall.

While water is passed through the filter 23 from the raw water side toward the treated water side at the intake time and refluxed through the filter 23 from the treated water side toward the raw water side at the backwash time due to the water level difference H1 or H2 in each of the aforementioned first to third embodiments, the present invention is not restricted to this. According to the present invention, the infiltration intake system may simply be configured to be capable of passing the water through the filter from the raw water side toward the treated water side at the intake time and refluxing the water through the filter from the treated water side toward the raw water side at the backwash time. For example, the infiltration intake system may be configured to be capable of passing water through a filter 23 from a raw water side (the upper side) toward a treated water side (the lower side) with a pump 303 connected not to an intake reservoir 3 but to a water guide pipe 303*a*, as in an infiltration intake system 400 according to a modification (a first modification) of the second embodiment shown in FIG. 6. In the infiltration intake system 400, the filter 23 can be washed (backwashed) by refluxing water through the filter 23 upward from below with the pump 303. The water guide pipe 303*a* is connected to a screen pipe 104. The infiltration intake system 400 and the pump 303 are examples of the "infiltration intake system for a revetment wall" and the "backwash mechanism portion" in the present invention respectively.

Further, the infiltration intake system may be provided with an outflow preventing portion 401 for inhibiting a filter 23 raised up by a vortex flow resulting from a wave or a flow or wastewater at a backwash time from flowing out of a filter storage portion 21, as an infiltration intake system 500 according to a second modification shown in FIG. 7. The outflow preventing portion 401 is formed above the filter storage portion 21 to be opposed thereto, and provided integrally on a revetment wall 401 to be inclined obliquely upward toward a direction separating from the revetment wall 401. Thus, the filter 23 so hits the outflow preventing portion 41c that force thereof is attenuated even if the same is raised up. Consequently, the raised-up filler 23 descends to return into the filter storage portion 21 again. Even if the filter 23 is lightweight, therefore, the same can be inhibited from flowing out of the filter storage portion 21 due to a vortex flow resulting from a wave or a flow or wastewater at a backwash time.

Further, the outflow preventing portion 401c is so formed to be inclined obliquely upward toward the direction separating the revetment wall 401 that wastewater can be guided to a direction separating from the filter storage portion 21, whereby the infiltration intake system 500 can be inhibited from intaking the wastewater. In this case, a wall portion 407 partitioning an opening between the outflow preventing portion 401c and a wall portion 20 into an upper opening 406a and a lower opening 406b may be provided anew. Thus, wastewater can be efficiently discharged from the upper opening 406a in the direction separating from the filter storage portion 21. The infiltration intake system 500 is an example of the "infiltration intake system for a revetment wall" in the present invention.

While the screen portion 22 constitutes the bottom portion of the filter storage portion 21 in the aforementioned first embodiment, the present invention is not restricted to this. For example, a bottom portion 520d provided integrally with a wall portion 520 and a revetment wall 501 may be provided on a filter storage portion 521 similarly to the bottom portion 220d of the infiltration intake structural body 202 according to the aforementioned third embodiment, as in a third modification shown in FIG. 8. The bottom portion 520d is provided with a plurality of hole portions 520e passing therethrough in the vertical direction. Further, a plurality of lid members 522 having openings on side surfaces thereof are arranged to cover end portions of the plurality of hole portions 520e on the side of the filter storage portion 521 (the upper side). Thus, water is circulated between a filter 23 and a water guide portion 4 through the hole portions 520e and the openings on the side surfaces of the lid members 522.

While the water is refluxed through the filter upward from below at the backwash time in each of the aforementioned first to third embodiments, the present invention is not restricted to this. According to the present invention, air may alternatively be refluxed through the filter upward from below at the backwash time with a pneumatic apparatus or the like, thereby discharging water and foreign matter present in the filter as wastewater from the structural body to follow the flow of the air. In the infiltration intake system 400 according to the first modification shown in FIG. 6, the filter 23 can be backwashed by refluxing air through the water guide pipe 303a, and hence no backwash pipe may be separately provided.

While one infiltration intake structural body is set on the revetment wall in each of the aforementioned first and second embodiments and the infiltration intake structural bodies 102 and 202 of the two-stage structure are set on the revetment wall 201 in the aforementioned third embodiment, the present invention is not restricted to this. According to the present invention, at least three (three stages of) infiltration intake structural bodies of a multistage structure may be set on a revetment wall.

While the plurality of screen pipes are arranged in the filter in each of the aforementioned second and third embodiments, the present invention is not restricted to this. According to the present invention, the screen pipes may be substituted by perforated (porous) pipes each provided with a plurality of holes having a hole diameter substantially not passing a filter therethrough or reticular screens having meshes of sizes substantially not passing a filter therethrough and dividing branch pipes and the filter from each other.

While the outer wall surface of the revetment wall constitutes the inner wall surface of the filter storage portion in each of the aforementioned first to third embodiments, the present invention is not restricted to this. According to the present invention, the outer wall surface of the revetment wall may not be employed but four inner wall surfaces of a rectangular infiltration intake structural body having four sides may constitute inner wall surfaces (inner side surfaces) of the filter storage portion.

While the infiltration intake structural body is formed integrally with the revetment wall in each of the aforementioned first to third embodiments, the present invention is not restricted to this. According to the present invention, the infiltration intake structural body may alternatively be formed separately from the revetment wall, to be thereafter set on the outer wall surface of the revetment wall.

DESCRIPTION OF REFERENCE NUMERALS 1, 101, 201, 401, 501: revetment wall
1a: outer wall surface
1b: inner wall surface (of the revetment wall)
2, 102, 202, 502: infiltration intake structural body (structural body)
3: intake reservoir (intake well, backwash mechanism portion)
4: water guide portion
20c: inner wall surface (of the structural body)
21, 121, 221, 521: filter storage portion
23: filter
23a: surface
100, 200, 300, 400, 500: infiltration intake system (infiltration intake system for a revetment wall)
104: screen pipe (water guide portion)
303: pump (backwash mechanism portion)

The invention claimed is:

1. An infiltration intake system for a revetment wall, comprising:
   a structural body, set on an outer wall surface of the revetment wall, including a filter storage portion;
   a filter stored in the filter storage portion of the structural body; and
   a water guide portion for guiding treated water passing through the filter toward the side of an inner wall surface of the revetment wall,
   wherein the filter has an upper surface directly exposed to water, and the upper surface of the filter is arranged substantially parallel to a water surface.

2. The infiltration intake system for a revetment wall according to claim 1, wherein
   the filter storage portion of the structural body is so provided as to extend substantially parallel with the water surface along the outer wall surface of the revetment wall.

3. The infiltration intake system for a revetment wall according to claim 1, wherein the structural body is so set on the outer wall surface of the revetment wall that the inner wall surface of the structural body and the outer wall surface of the revetment wall constitute an inner wall surface of the filter storage portion, and the structural body has a second wall extending parallel to the revetment wall, and the filter is arranged between the second wall and the revetment wall.

4. The infiltration intake system for a revetment wall according to claim 1, further comprising an intake well, set on the side of the inner wall surface of the revetment wall, having a water level lower than the water level of raw water on the side of the outer wall surface of the revetment wall, and so configured that the raw water passes through the filter and flows into the intake well through the water guide portion due to the difference between the water level of the raw water in the vicinity of the outer wall surface of the revetment wall and the water level of the intake well.

5. The infiltration intake system for a revetment wall according to claim 1, wherein the filter is arranged on a position where a vortex flow is generated on the upper surface of the filter stored in the filter storage portion when a wave or a flow reaches the outer wall surface of the revetment wall.

6. The infiltration intake system for a revetment wall according to claim 5, wherein the vortex flow occurs across the upper surface of the filter.

7. The infiltration intake system for a revetment wall according to claim 1, wherein the structural body is formed integrally with the revetment wall.

8. The infiltration intake system for a revetment wall according to claim 1, further comprising a backwash mechanism portion washing the filter by refluxing water from the side of the water guide portion toward the side of the filter.

9. The infiltration intake system for a revetment wall according to claim 1, wherein a plurality of the structural bodies are set on the outer wall surface of the revetment wall at prescribed intervals in the vertical direction.

10. The infiltration intake system for a revetment wall according to claim 1, wherein the upper surface of the filter is configured to extend perpendicular to the revetment wall.

11. The infiltration intake system for a revetment wall according to claim 1, wherein the structural body is lower than the revetment wall and a water level.

12. The infiltration intake system for a revetment wall according to claim 1, wherein the structural body has an upwardly facing opening at an upper end thereof and a lower end fluidly communicated with the water guide portion so as to conduct water vertically through the filter in the filter storage portion.

13. The infiltration intake system for a revetment wall according to claim 1, wherein the structural body is spaced at a distance below an upper edge of the revetment wall such that a wave or flow passing over the structural body creates a vortex flow across the upper surface of the filter.

* * * * *